(12) United States Patent
Cao et al.

(10) Patent No.: US 9,450,841 B2
(45) Date of Patent: *Sep. 20, 2016

(54) STREAMING STATE DATA FOR CLOUD MANAGEMENT

(71) Applicant: International Business Machines Corporation, Armonk, NY (US)

(72) Inventors: Bin Cao, Rochester, MN (US); Jim C. Chen, Rochester, MN (US); Michael J. Fork, Gibsonburg, OH (US)

(73) Assignee: International Business Machines Corporation, Armonk, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/074,792

(22) Filed: Nov. 8, 2013

(65) Prior Publication Data

US 2015/0127810 A1 May 7, 2015

Related U.S. Application Data

(63) Continuation of application No. 14/074,220, filed on Nov. 7, 2013, now Pat. No. 9,130,831.

(51) Int. Cl.
*H04L 12/26* (2006.01)
*H04L 29/06* (2006.01)
*H04L 29/08* (2006.01)

(52) U.S. Cl.
CPC .............. *H04L 43/08* (2013.01); *H04L 43/04* (2013.01); *H04L 65/4069* (2013.01); *H04L 65/60* (2013.01); *H04L 65/602* (2013.01); *H04L 67/1002* (2013.01); *H04L 65/604* (2013.01); *H04L 67/10* (2013.01)

(58) Field of Classification Search
CPC ............................ H04L 12/26; H04L 43/04
USPC ........................................... 709/224
See application file for complete search history.

(56) References Cited

U.S. PATENT DOCUMENTS

| | | | |
|---|---|---|---|
| 6,047,323 A | 4/2000 | Krause | |
| 7,010,538 B1 | 3/2006 | Black | |
| 8,386,466 B2 | 2/2013 | Park et al. | |
| 2011/0265168 A1* | 10/2011 | Lucovsky | H04L 63/0245 726/7 |
| 2012/0254825 A1 | 10/2012 | Sharma et al. | |
| 2012/0317276 A1 | 12/2012 | Muniraju | |
| 2012/0324453 A1* | 12/2012 | Chandramouli | G06F 17/30516 718/100 |
| 2013/0007265 A1 | 1/2013 | Benedetti et al. | |

(Continued)

OTHER PUBLICATIONS

Cervino et al., "Adaptive Provisioning of Stream Processing Systems in the Cloud," 2012 IEEE 28th International Conference on Data Engineering Workshops (ICDEW), Apr. 2012.

(Continued)

*Primary Examiner* — David Lazaro
*Assistant Examiner* — Zia Khurshid
(74) *Attorney, Agent, or Firm* — Martin & Associates, LLC; Derek P. Martin (57) ABSTRACT

A cloud manager uses streams to monitor state of the cloud. A cloud state streaming policy specifies state data to stream, along with one or more initial operators for processing the streams. An archive mechanism allows archiving the streamed data when specified data in the streams exceeds one or more defined thresholds. A user interface allows adjusting the streaming of cloud state data to focus on data of interest to a user. The cloud manager thus allows a user to determine state of a cloud via the streamed state data.

17 Claims, 9 Drawing Sheets

(56) References Cited

U.S. PATENT DOCUMENTS

| | | |
|---|---|---|
| 2013/0007281 A1 | 1/2013 | Banerjee et al. |
| 2013/0031124 A1 | 1/2013 | Santosuosso et al. |
| 2013/0054779 A1 | 2/2013 | Cradick et al. |
| 2013/0103832 A1 | 4/2013 | Cradick et al. |
| 2013/0219370 A1 | 8/2013 | Beale et al. |
| 2013/0225122 A1 | 8/2013 | Kahn et al. |
| 2014/0189064 A1* | 7/2014 | Cilli ............... H04N 21/23439 709/219 |
| 2014/0379892 A1 | 12/2014 | Klimov et al. |

OTHER PUBLICATIONS

Sivakumar et al., "Closer to the Cloud—A Case for Emulating Cloud Dynamics by Controlling the Environment," NSF GENI Research and Education Experiment Workshop 2012.

Log Streams—Stakato 2.10 documentation, printed Sep. 13, 2013.

* cited by examiner

CPU Usage Threshold = 80%

FIG. 12

FIG. 13

STREAMING STATE DATA FOR CLOUD MANAGEMENT

BACKGROUND

1. Technical Field

This disclosure generally relates to computer systems, and more specifically relates to managing a cloud computing environment using streaming state data.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments known as virtual machines. The System X computer system developed by IBM is an example of a computer system that supports logical partitioning into multiple virtual machines. If multiple virtual machines on a System X computer system are desired, partition manager code (referred to as a "hypervisor" in IBM terminology) is installed that allows defining different virtual machines on the same platform. Once the partition manager is installed, virtual machines may be created that define different computing environments. The partition manager manages the logical partitions to assure that they can share needed resources in the computer system while maintaining the separate computing environments defined by the virtual machines.

Virtual machines are used extensively in computing solutions that are cloud-based. As the demands for cloud solutions increase, open source software for building clouds, such as OpenStack, have become a building block for creating a reliable and flexible cloud platform.

As cloud environments continue to grow in scale, management of the cloud environment becomes more complex and problematic. When a problem occurs in one virtual machine (VM) or in one localized section of the cloud environment, the task of determining the cause of the problem can be complex and labor-intensive. For example if there are 70 compute nodes in a cloud environment and the system encounters an issue, and if the root cause is not trivial, the administrator may face the task of having to examine possibly all 70 VMs to collect diagnostic data. In most cases the actual root cause may have occurred in some point in time prior to observable problems being detected. In many cases a root cause is in actuality a combination of two or more factors which static logging methods may not have the ability to correlate and as such administrators would need to manually mine this information. Aggressive static logging also has negative performance impacts and storage impacts if the system is trying to log everything and save that quantity of information to disk.

In global cloud environments where administrators may reside in different locations, there may be a knowledge gap of the current state of the cloud landscape that administrators in one time zone are aware of but may not have been apparent or known by administrators in another time zone. Things as simple as an administrator in the United States wanting to shutdown a system based in China but is not sure what IP addresses are in use or who are active users, which is information that would be known by the China-based administrators. There is currently no solution for allowing an administrator to determine current state of the cloud without taking many manual steps to interrogate the state of many individual VMs and host computer systems.

BRIEF SUMMARY

A cloud manager uses streams to monitor state of the cloud. A cloud state streaming policy specifies state data to stream, along with one or more initial operators for processing the streams. An archive mechanism allows archiving the streamed data when specified data in the streams exceeds one or more defined thresholds. A user interface allows adjusting the streaming of cloud state data to focus on data of interest to a user. The cloud manager thus allows a user to determine state of a cloud via the streamed state data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a cloud manager that uses streams to monitor state of the cloud. A cloud state streaming policy specifies state data to stream, along with one or more initial operators for processing the streams. An archive mechanism allows archiving the streamed data when specified data in the streams exceeds one or more defined thresholds. A user interface allows adjusting the streaming of cloud state data to focus on data of interest to a user. The cloud manager thus allows a user to determine state of a cloud via the streamed state data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
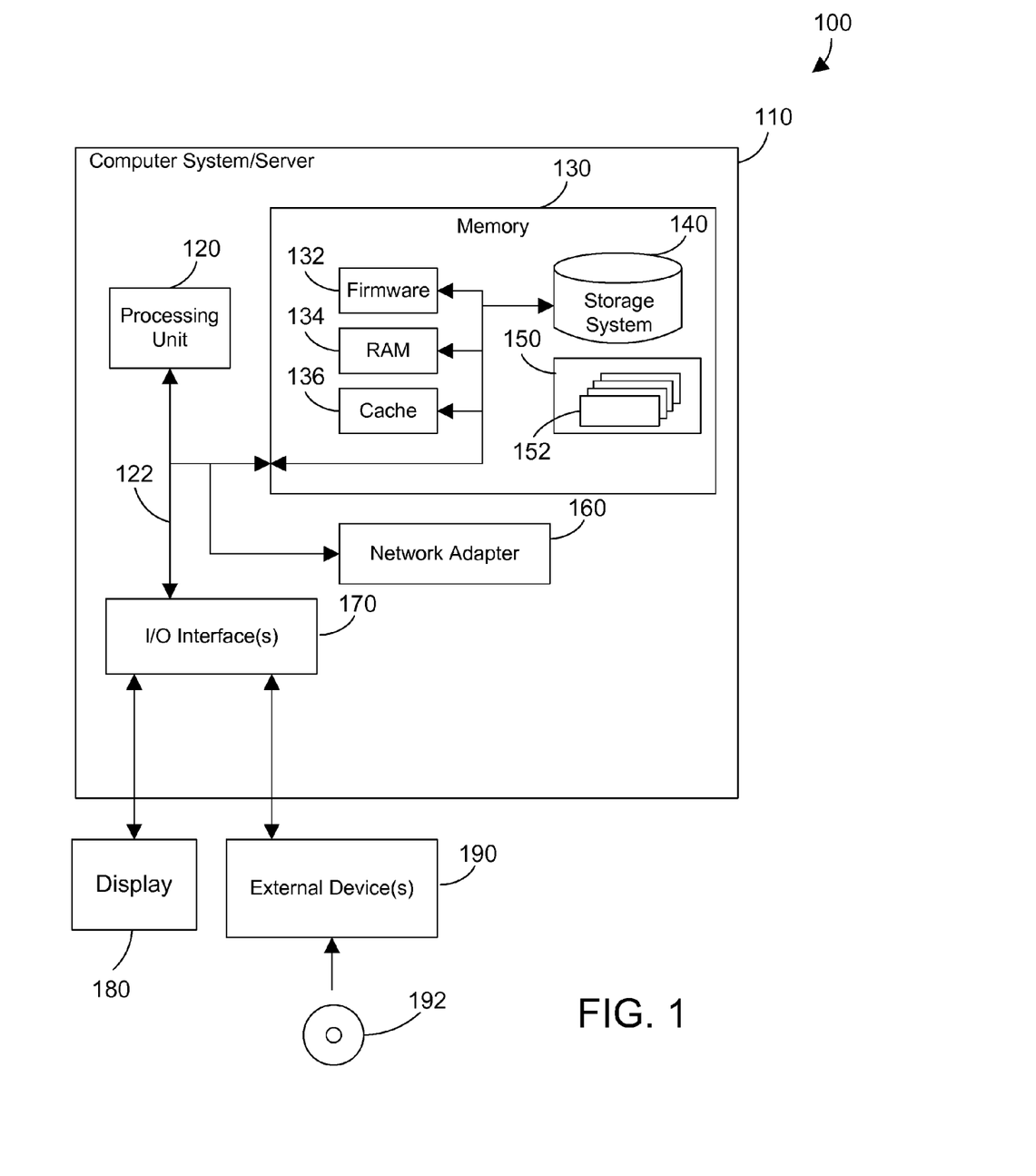
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
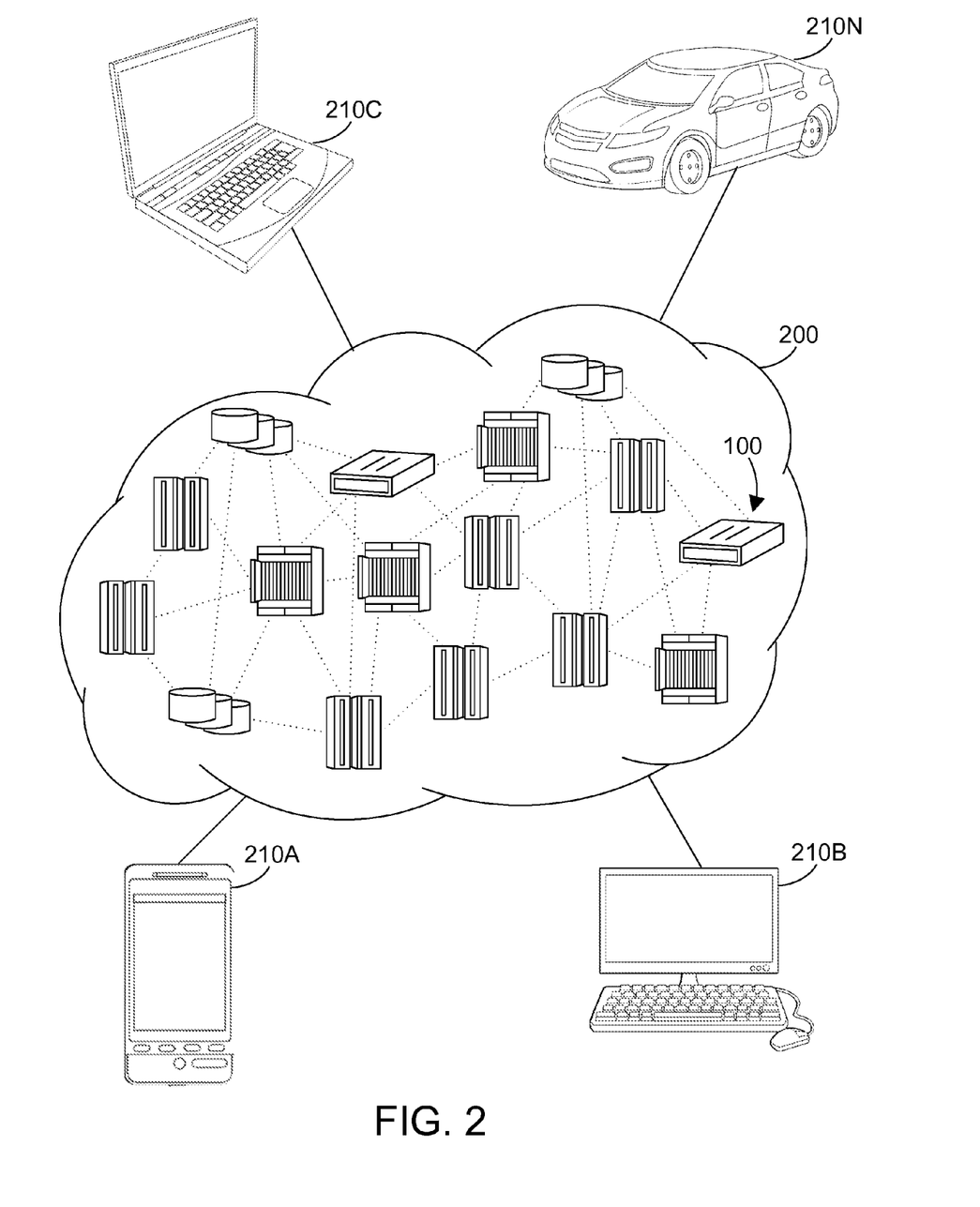
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
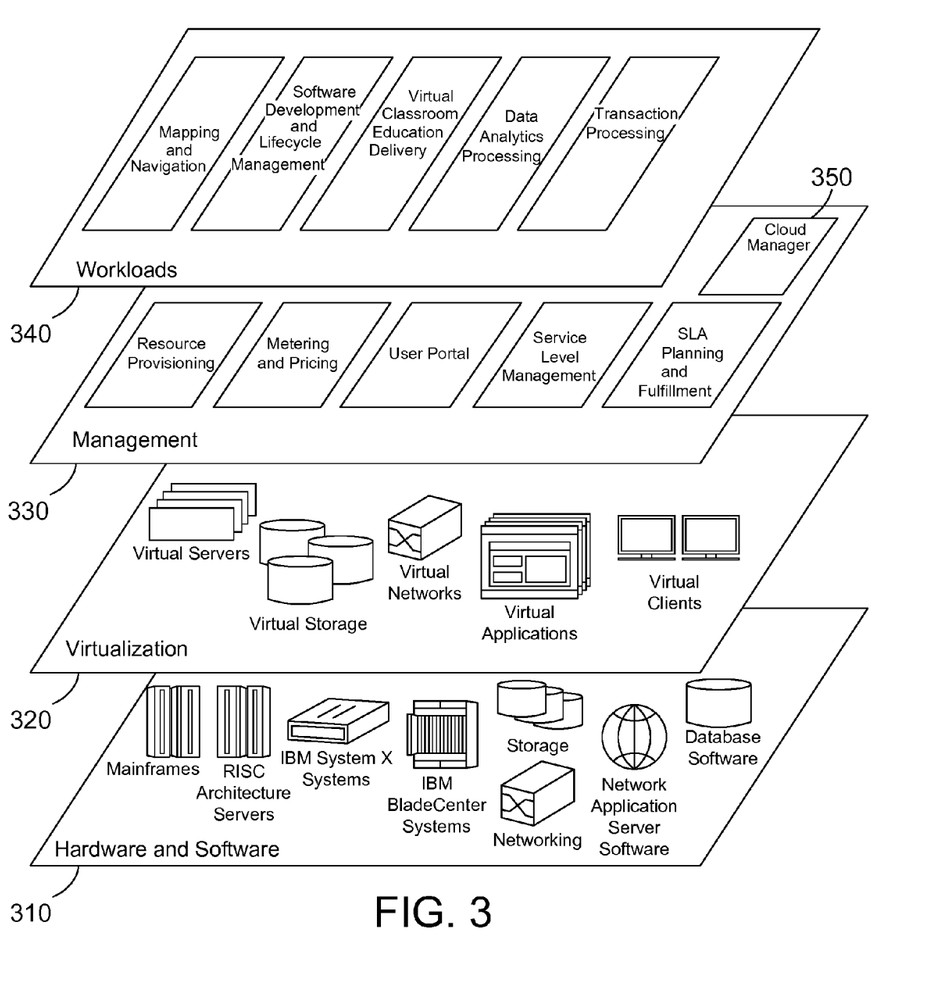
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
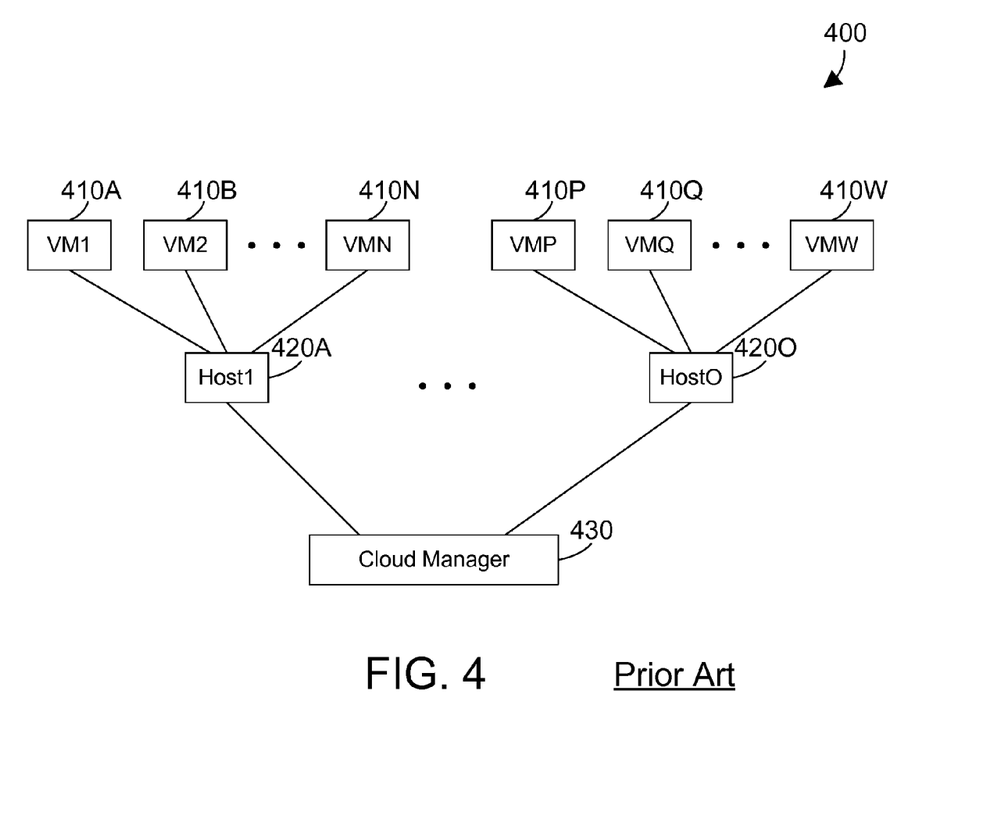
FIG. 4 is a block diagram of a prior art system for managing a cloud computing system.

FIG. 4 shows an example of a prior art cloud computer system 400. The cloud computer system comprises multiple host computer systems 420, represented in FIG. 7 as Host 1 420A, . . . , HostO 420O. Each host computer system could be a computer system/server 110 as shown in FIG. 1. Each host computer system 420 has multiple virtual machines (VMs) 410. Thus, for the specific example in FIG. 4, host1 420A includes VMs 410A, 410B, . . . , 410N, while hostO 420O includes VMs 410P, 410Q, . . . , 410W. Note FIG. 4 is simplified for the purpose of illustration. A cloud computer system 400 could include any suitable numbers of hosts and virtual machines. A cloud manager 430 is connected to each host, and is used to manage the cloud computer system 400. A system administrator can use a user interface provided by the cloud manager 430 to perform any suitable cloud management function known in the art, including starting and stopping virtual machines and retrieving state data from a host computer system or from any virtual machine.

Figure 5:
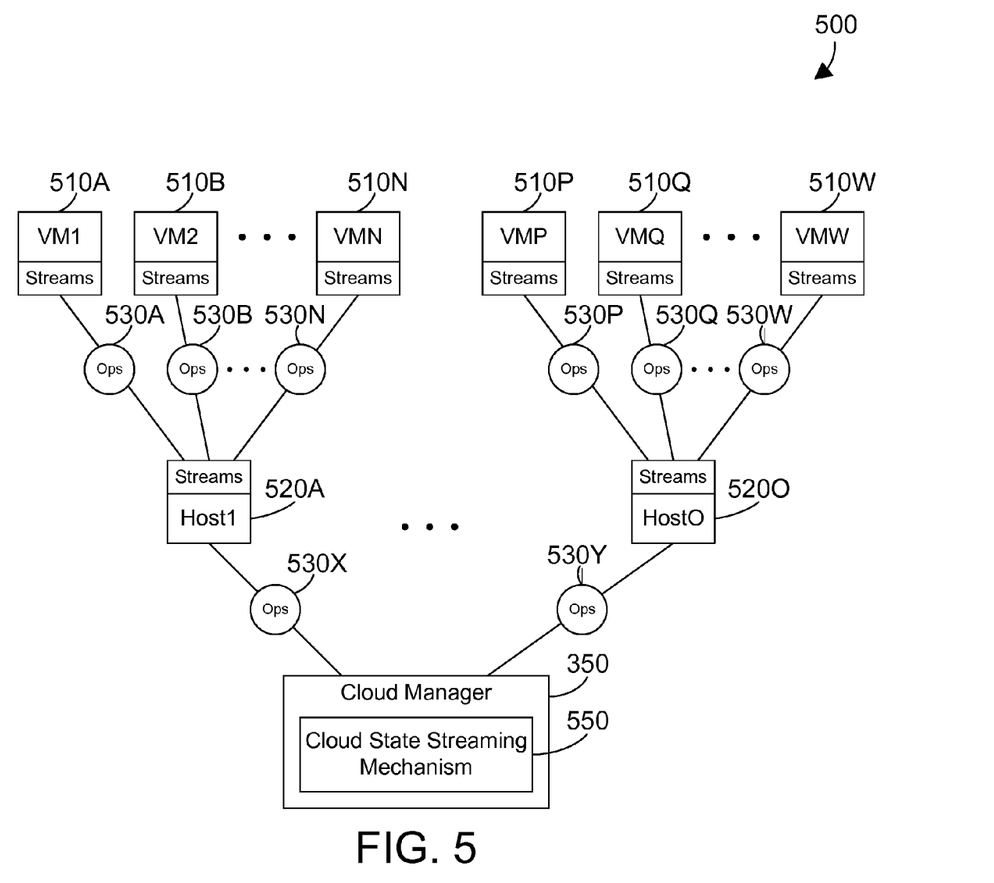
FIG. 5 is a block diagram of a system for managing a cloud computing system using streams.

FIG. 5 shows one example of a cloud computer system 500 that is managed using streams as disclosed and claimed herein. Cloud computer system 500 includes multiple hosts 520, shown in FIG. 5 as 520A, . . . , 520O. Multiple virtual machines (VMs) are deployed on each host. Thus, host 520A includes VMs 510A, 510B, . . . , 510N, while host 520O includes VMs 510P, 510Q, . . . , 510W. Each host and VM may include streams that can stream state data. One or more operators can be defined to process the streamed stated data. Examples of operators shown in FIG. 5 include operators 530A, 530B, . . . , 530N, operators 530P, 530Q, . . . , 530W, and operators 530X and 530Y. Note that not all hosts or VMs will necessarily have a corresponding operator.

The cloud manager 350 in FIG. 5 is one specific example for the cloud manager 350 in FIG. 3. Cloud manager 350 includes a cloud state streaming mechanism 550 that initializes the streams on the VMs and the hosts, receives the streams, and allows archiving, analysis and adjustment of the state data in the streams. While cloud computing is known in the art and streaming applications are known in the art, the cloud computer system 500 uses streams to send state data to a cloud manager, thereby allowing a user of the cloud manager 350 to receive and analyze any needed state data from any needed entity in the cloud. The cloud state streaming mechanism 550 thus provides a very flexible and powerful way to receive state data for the cloud in near real-time without the need of performing vast amounts of static logging, which can negatively impact system performance.

Figure 6:
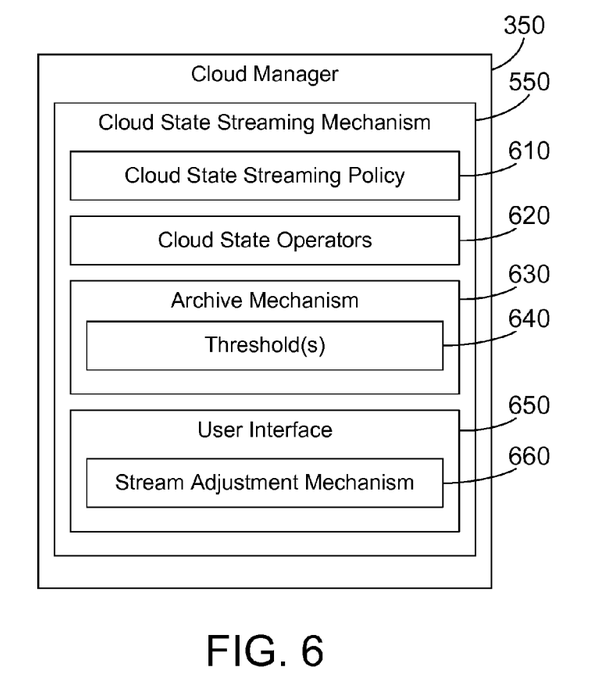
FIG. 6 is a block diagram showing one specific implementation of the cloud manager shown in FIG. 3.
Figure 7:
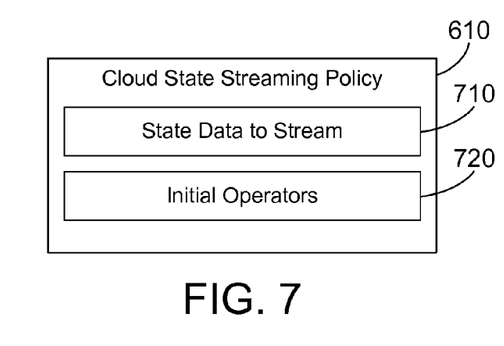
FIG. 7 is a block diagram showing one specific implementation of the cloud state streaming policy shown in FIG. 6.

One suitable example for the cloud manager 350 in FIGS. 3 and 5 includes a cloud state streaming mechanism 550 as discussed above. One suitable example for the cloud state streaming mechanism 550 is shown in FIG. 6 to include a cloud state streaming policy 610, cloud state operators 620, an archive mechanism 630, and a user interface 650. One suitable example for the cloud state streaming policy 610 is shown in FIG. 7 to specify state data to stream 710 and initial operators 720. The cloud state operators 620 in FIG. 6 include all operators that support the processing of state data sent to the cloud state streaming mechanism 550. Archive mechanism 630 defines one or more thresholds 640 that trigger archiving of streamed state data. Thresholds 640 could thus be defined for normal operating conditions, with conditions that do not satisfy thresholds 640 being defined to be abnormal operating conditions that trigger logging the state data for future analysis. Note that thresholds 640 can include any suitable threshold or heuristic expression for determining what is normal and what is abnormal, and can be expressed in any suitable units. The user interface 650 provides a stream adjustment mechanism 660 that allows a user to adjust the streams of state data according to the user's needs. The stream adjustment mechanism 660 can adjust the state data being streamed, the operators operating on the state data being streamed, or both. Adjusting the operators can include adjusting existing operators and/or adding one or more new operators, as discussed in more detail below.

Figure 8:
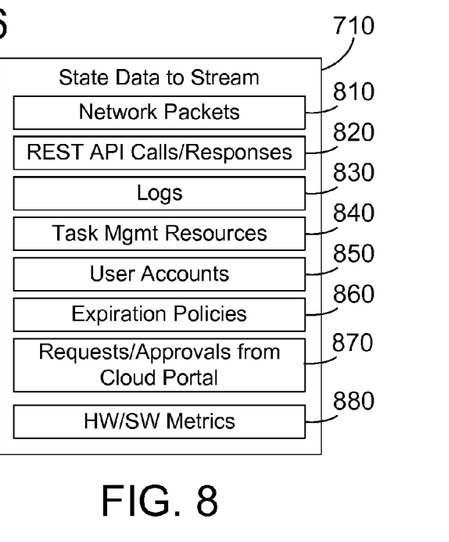
FIG. 8 is a block diagram showing examples of state data to stream.

FIG. 8 shows some examples of state data to stream 710 shown in FIG. 7. State data to stream 710 can include any or all of network packets 810, representational state transfer (REST) application programming interface (API) calls/responses 820, logs 830, task management resources 840, user accounts 850, expiration policies 860, requests/approvals from the cloud portal 870, and hardware/software metrics 880. Network packets 810 can include packets from physical networks and packets from virtual networks. REST API calls/responses 820 can include any calls and any response to any REST API. Logs 830 can include state data from any log in any VM or host computer system. Task management resources 840 can include any resources used to manage tasks in the VMs and/or host computer systems. Expiration policies 860 include policies that define a lifecycle for one or more virtual machines. For example, the expiration policies 960 could include specifying to destroy, pause, renew, suspend, and resume a virtual machine when specified conditions are satisfied. Requests/approvals from cloud portal 870 include requests from a user to the cloud portal, and approvals given by a cloud administrator in response to the requests from the user. Hardware/software metrics 880 include any suitable metrics for measuring performance of any hardware or software in the virtual machine. For example, hardware/software metrics 880 could include metrics that measure processor usage, memory usage, storage usage, usage of virtual networks, etc.

Figure 9:
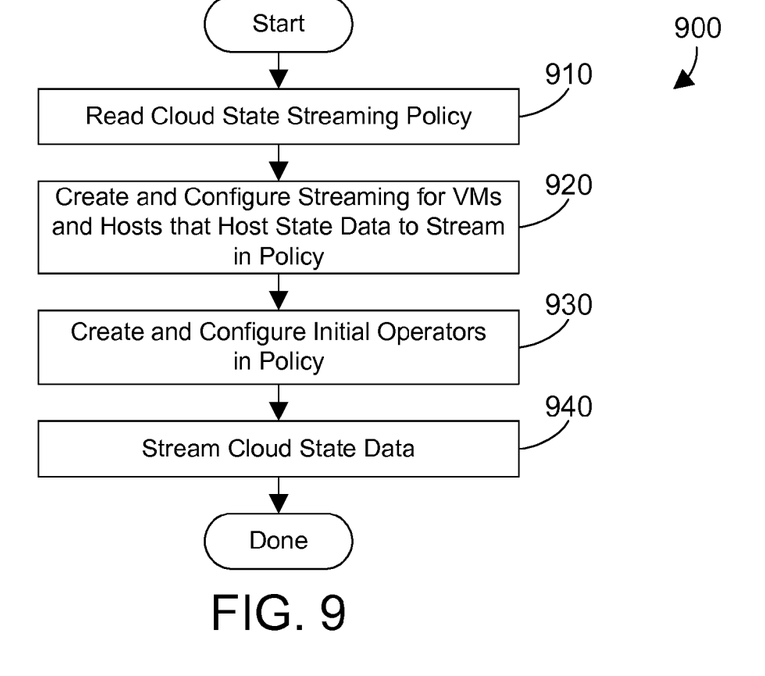
FIG. 9 is a flow diagram of a method for streaming cloud state data.

Referring to FIG. 9, a method 900 is preferably performed by the cloud state streaming mechanism 550 shown in FIGS. 5 and 6. The cloud state streaming policy is read (step 910). A determination is made regarding which VMs and host computer systems host the state data to stream specified in the streaming policy, and streaming for these VMs and host computer systems is created and configured (step 920). The initial operators specified in the streaming policy are then created and configured (step 930). The cloud state data is then streamed (step 940). Method 900 is then done.

Figure 10:
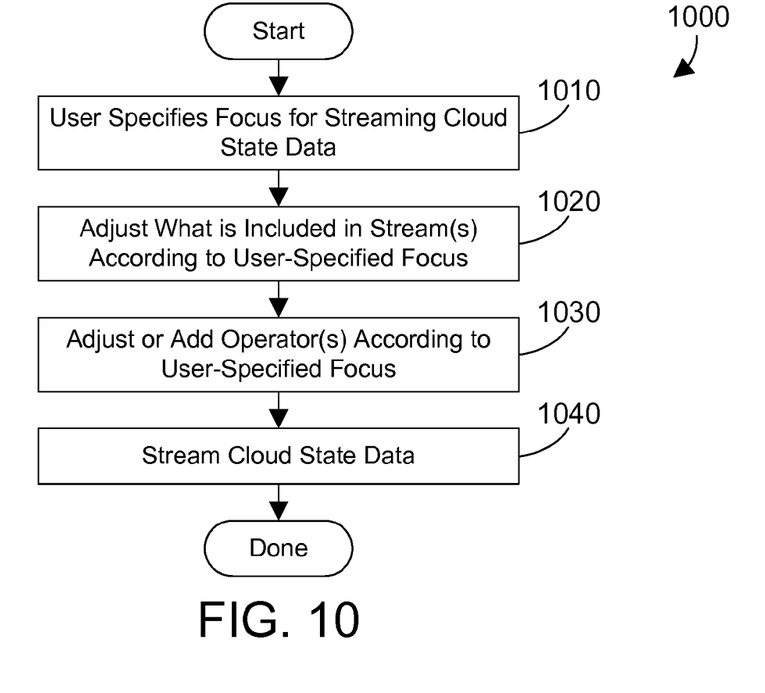
FIG. 10 is a flow diagram of a method for adjusting the streaming of cloud state data.

Once the streaming of state data is initialized in method 900, the streaming state data can be adjusted by a user. Referring to FIG. 10, a method 1000 begins when a user specifies focus for streaming cloud state data (step 1010). Which state data is included in one or more streams may be adjusted according to the user-specified focus (step 1020). One or more existing operators can be adjusted and/or one or more new operators can be added according to the user-specified focus (step 1030). The cloud state data is then streamed (step 1040), which now includes state data according to the user-specified focus. For example, let's assume the streaming state data indicates network usage is high. The user could specify a focus on network usage, which could cause state data for networks not previously monitored to be included in the streamed state data so the user can better understand which networks are experiencing high usage.

Figure 11:
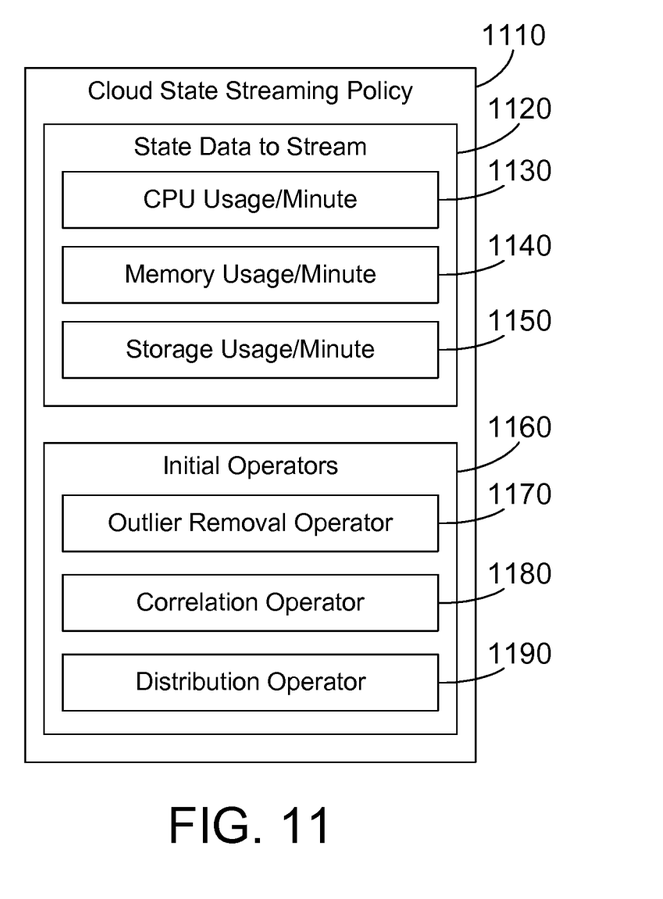
FIG. 11 is a block diagram of one specific example of a cloud state streaming policy.
Figure 12:
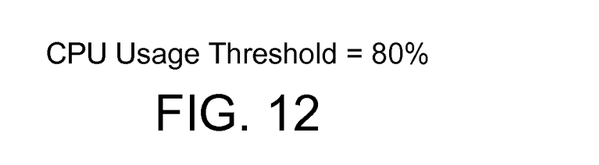
FIG. 12 shows one example of a threshold for archiving streamed stated data.
Figure 13:
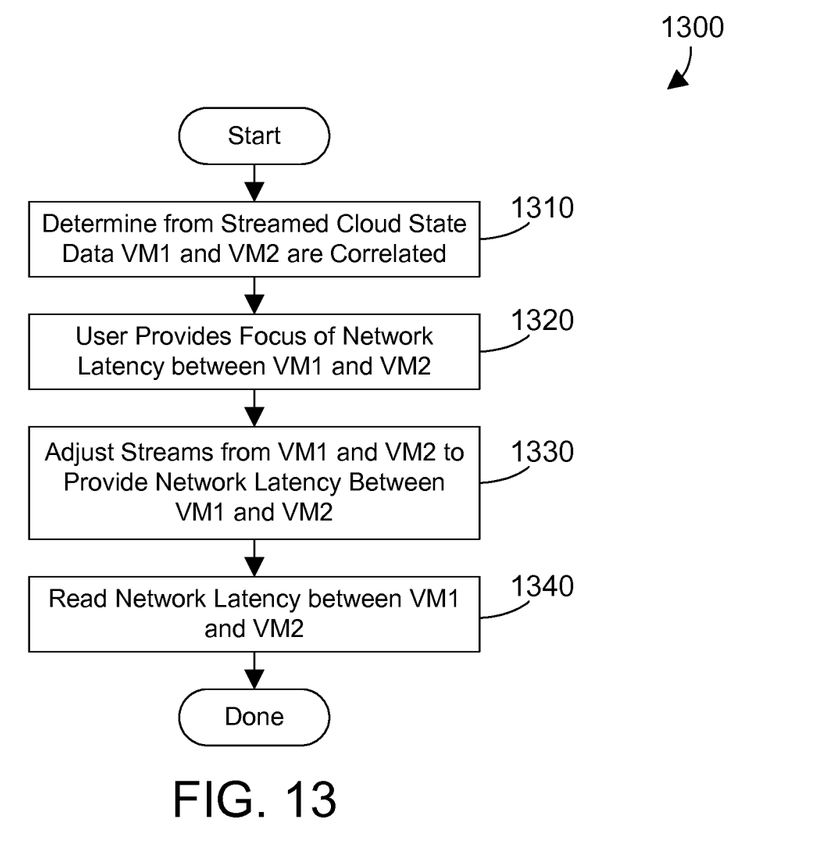
FIG. 13 is a flow diagram of a method for streaming state data for the example shown in FIG. 11.

Specific examples are presented in FIGS. 11-13 to illustrate aspects of the cloud manager. A cloud streaming policy 1110 is shown in FIG. 11 to include state data to stream 1120 and initial operators 1160. State data to stream 1120 includes CPU usage per minute 1130, memory usage per minute 1140, and storage usage per minute 1150. These are given by way of example to illustrate some specific state data that could be streamed, and represent some suitable examples of hardware/software metrics 880. Initial operators 1160 include an outlier removal operator 1170, a correlation operator 1180, and a distribution operator 1190. FIG. 12 shows an example of a threshold 640 for archive mechanism 630 shown in FIG. 6, which specifies a CPU usage threshold of 80%. For this specific example, this means as long as the state data shows CPU usage/minute less than 80% of capacity, the streamed state data is not archived. When the CPU usage/minute exceeds 80% of capacity, the streamed data is archived. This shows how thresholds can be used to automatically trigger archiving the streamed state data for later analysis. By providing one or more thresholds that determine when state data needs to be archived, static logging of vast amounts of state data by the cloud manager can be avoided.

The outlier removal operator 1170 provides statistical analysis and removes one or more tuples that are statistical outliers, meaning their values are too high or too low to be of statistical significance. The outlier removal operator 1170 essentially reduces noise in the streamed state data. The correlation operator 1180 can determine when there is a correlation between entities in the cloud, such as between VMs. The distribution operator 1190 determines how to distribute stream data, such as determining where to send data for analysis or some other operation.

Referring to FIG. 13, method 1300 determines from the streamed cloud state data that two virtual machines denoted VM1 and VM2 are correlated (step 1310). Step 1310 is preferably performed by the correlation operator 1180 shown in FIG. 11. When a user sees the correlation between VM1 and VM2, the user can specify a focus to the stream adjustment mechanism so state data corresponding to the specified focus can be streamed and analyzed. The stream adjustment mechanism adjusts the streams from VM1 and VM2 to provide network latency between VM1 and VM2 (step 1330). The network latency between VM1 and VM2 is then read from the state data in the adjusted streams (step 1340).

The cloud manager thus has the ability to be initially configured to start streaming state data for entities in the cloud, and can also be dynamically adjusted as well. This provides a very powerful and flexible way to monitor state of a cloud computing system.

The disclosure and claims herein relate to a cloud manager that uses streams to monitor state of the cloud. A cloud state streaming policy specifies state data to stream, along with one or more initial operators for processing the streams. An archive mechanism allows archiving the streamed data when specified data in the streams exceeds one or more defined thresholds. A user interface allows adjusting the streaming of cloud state data to focus on data of interest to a user. The cloud manager thus allows a user to determine state of a cloud via the streamed state data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor; and
   a manager residing in the memory and executed by the at least one processor, the manager comprising a state streaming mechanism that initializes a first plurality of streams on a plurality of virtual machines coupled to the apparatus, the first plurality of streams comprising state data for the plurality of virtual machines, wherein the state streaming mechanism initializes a second plurality of streams on a plurality of host computer systems coupled to the apparatus, the second plurality of streams comprising state data for the plurality of host computer systems, the state streaming mechanism creating a plurality of operators to operate on at least one stream in the first and second plurality of streams, wherein the state data comprises network packets, representation state transfer (REST) application programming interface (API) calls and responses, logs, task management resources, user accounts, and expiration policies.

2. The apparatus of claim 1 wherein the manager comprises a cloud manager and the plurality of virtual machines and the plurality of host computer systems are in at least one cloud.

3. The apparatus of claim 1 further comprising a state streaming policy that specifies:
   state data to stream in the first and second plurality of streams; and
   the plurality of operators.

4. The apparatus of claim 1 wherein the state data comprises processor usage, memory usage and storage usage.

5. The apparatus of claim 1 wherein the manager comprises an archive mechanism that archives streamed data that satisfies at least one user-specified threshold.

6. The apparatus of claim 1 wherein the manager comprises a user interface that includes a stream adjustment mechanism for adjusting streamed data according to a user-specified focus.

7. The apparatus of claim 6 wherein the stream adjustment mechanism adjusts what is included in at least one of the first and second plurality of streams according to the user-specified focus.

8. The apparatus of claim 6 wherein the stream adjustment mechanism adjusts at least one of the plurality of operators according to the user-specified focus by performing at least one of:
   adjusting function of at least one existing operator; and
   adding at least one new operator.

9. An apparatus comprising:
   at least one processor;
   a memory coupled to the at least one processor; and
   a manager residing in the memory and executed by the at least one processor, the manager comprising a state streaming mechanism that reads a state streaming policy that specifies state data to stream and a plurality of operators, wherein the state data to stream comprises network packets, representation state transfer (REST) application programming interface (API) calls and responses, logs, task management resources, user accounts, and expiration policies, wherein the state streaming mechanism initializes a first plurality of streams on a plurality of virtual machines in the cloud computer system, the first plurality of streams comprising the state data to stream for the plurality of virtual machines, wherein the state streaming mechanism initializes a second plurality of streams on a plurality of host computer systems in the cloud computer system, the second plurality of streams comprising the state data to stream for the plurality of host computer systems, wherein the state streaming mechanism creates a plurality of operators to operate on at least one stream in the first and second plurality of streams, wherein the state streaming mechanism archives streamed data that satisfies at least one user-specified threshold, wherein the state streaming mechanism provides a user interface for adjusting streamed data according to a user-specified focus, wherein adjusting the streamed data comprises at least one of:
   adjusting what is included in at least one of the first and second plurality of streams according to the user-specified focus;
   adjusting function of at least one existing operator; and
   adding at least one new operator.

10. An article of manufacture comprising software executed by at least one processor, the software residing on a non-transitory computer-readable medium, the software comprising:

a manager comprising a state streaming mechanism that initializes a first plurality of streams on a plurality of virtual machines coupled to an apparatus, the first plurality of streams comprising state data for the plurality of virtual machines, wherein the state streaming mechanism initializes a second plurality of streams on a plurality of host computer systems coupled to the apparatus, the second plurality of streams comprising state data for the plurality of host computer systems, the state streaming mechanism creating a plurality of operators to operate on at least one stream in the first and second plurality of streams, wherein the state data comprises network packets, representation state transfer (REST) application programming interface (API) calls and responses, logs, task management resources, user accounts, and expiration policies.

11. The article of manufacture of claim 10 wherein the manager comprises a cloud manager and the plurality of virtual machines and the plurality of host computer systems are in at least one cloud.

12. The article of manufacture of claim 10 further comprising a state streaming policy that specifies:

state data to stream in the first and second plurality of streams; and the plurality of operators.

13. The article of manufacture of claim 10 wherein the state data comprises processor usage, memory usage and storage usage.

14. The article of manufacture of claim 10 wherein the manager comprises an archive mechanism that archives streamed data that satisfies at least one user-specified threshold.

15. The article of manufacture of claim 10 wherein the manager comprises a user interface that includes a stream adjustment mechanism for adjusting streamed data according to a user-specified focus.

16. The article of manufacture of claim 15 wherein the stream adjustment mechanism adjusts what is included in at least one of the first and second plurality of streams according to the user-specified focus.

17. The article of manufacture of claim 15 wherein the stream adjustment mechanism adjusts at least one of the plurality of operators according to the user-specified focus by performing at least one of:

adjusting function of at least one existing operator; and
adding at least one new operator.

* * * * *